Aug. 21, 1956 W. C. SPEED ET AL 2,759,677

PRODUCTION OF MAGNETIC SOUND TAPE

Filed Dec. 21, 1950

INVENTORS
William C. Speed
James J. Dwyer
BY
Pennie, Edmonds, Morton & Barrows
ATTORNEYS 2,759,677

PRODUCTION OF MAGNETIC SOUND TAPE

William C. Speed, Riverside, and James J. Dwyer, Stamford, Conn., assignors to Audio Devices, Inc., New York, N. Y., a corporation of New York Application December 21, 1950, Serial No. 201,983

5 Claims. (Cl. 242—55)

This invention relates to the production of magnetic recording tape and has for its object improvements in the method of and apparatus for discharging coated tape base from a drying zone and winding it into a roll or rolls.

In copending applications, Serial Nos. 201,974 and 201,975, now Patent No. 2,700,367, filed simultaneously herewith, there is disclosed what may be referred to briefly as an overall method of an apparatus for producing magnetic recording tape. Tape base is processed in a succession of zones including charging, pre-coating and pre-drying partially if desired, magnetic coating, drying, magnetic testing, discharging and winding, etc. The present application relates to the method and apparatus involved more specifically in the discharge of the coated tape base from the drying zone and the winding of the discharged tape base into a roll or rolls.

Various tape base materials may be used, such as plastics, paper, etc., the most common being paper and cellulose acetate. Various magnetic materials may be used for the coating, the one most commonly used at the present time being very finely divided magnetic oxide of iron; not the natural magnetic oxide of iron, but one that is produced artificially because its quality can be better controlled. A dispersion of the magnetic material in a suitable vehicle or carrier is prepared, the vehicle usually carrying a solvent such as toluol, isopropyl acetate, etc. The dispersion, while free-flowing, has a viscosity conducive to the laying of a coating of given thickness on the tape base which remains substantially intact during the drying operation. The solvent is volatilized during the drying operation, leaving a solid but pliable residue of the magnetic material on the tape base.

In order to facilitate and to improve adherence of the magnetic material on the tape base, the surface of the tape base to be coated with the magnetic material may be pre-coated with a suitable adhesive material, such as a copolymer of polybutadiene with acrylonitrile, the methyl esters of acrylic acid, etc. The magnetic material is then laid on the adhesive surface and subjected to partial drying.

Various expedients are employed to dry the magnetic coating, such as passing the freshly coated tape base while under tension into and through a drying chamber in an extended path of travel, and then winding the dried coated tape base into a roll or rolls, on a power driven shaft. The rolls are usually wound to contain a predetermined amount of coated tape base. This means that the tape base leaving the drying chamber usually must be cut transversely by an operator when the desired amount is wound into a roll. He and another operator or two quickly remove the roll from the shaft and place the shaft in condition to wind the next roll.

Since it is inadvisable to stop the coating and drying operations while the roll is taken from the shaft and the shaft is made ready for the next roll, the discharge of coated tape base from the drying chamber should continue. Unless the forward end of the cut tape base leaving the chamber is held by an operator, the tension in the tape base in the chamber is broken or reduced; the forward end of the tape base springs back into the chamber; the on-coming tape base piles up in the chamber; and a great deal of confusion is caused. Much of the dried coated tape base may be damaged; it may be necessary to stop the coating operation and hence the drying operation in order to straighten out or remove the piled up tape base. Such occurrences are not only vexacious but costly in time, labor and material.

Another difficulty encountered in practice is that of removing a roll of tape base from the power driven shaft and making the shaft ready for the winding of the next roll. Even though the forward end of the cut tape base leaving the drying chamber does not spring back into the chamber, the tape base leaving the chamber tends to pile up while the roll is being removed and the shaft is being prepared for the next roll. The longer the time required for making this change the larger is the amount of tape base outside of the chamber that must be wound onto the next roll. Here again coated tape base may be damaged and the amount of tape base accumulated outside the chamber may become so large as to require a shut down of the coating and drying operations until it is wound into the next roll. This, too, is not only vexacious but costly in time, labor and material.

Investigations have led to the discovery that difficulties and disadvantages of the kind enumerated may for the most part be avoided in the practice of the present invention. The method followed and the apparatus employed make it impossible for the forward end of the cut tape base to spring back into the drying chamber. A complete roll of tape base may be quickly removed and the shaft quickly prepared for the next roll so that the discharging of the tape base from the chamber and the rolling of the tape base may be a substantially continuous operation.

These and other features of the invention will be better understood by referring to the accompanying drawings, taken in conjunction with the following description, in which.

Figure 1:
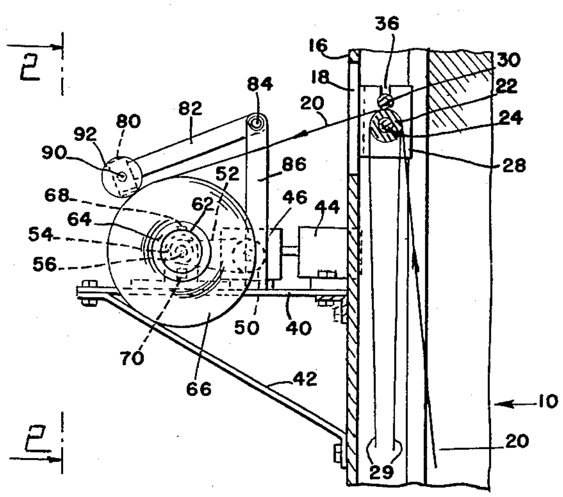
Fig. 1 is a side elevational section on the line 1—1 of Fig. 2 of an apparatus illustrative of a practice of the invention, showing a fragmentary portion of the coated tape base discharging end of a drying chamber and a roll winding device associated with that portion of the chamber.

The apparatus shown includes the coated tape base discharge portion of a drying chamber 10 having a near side wall 12, a far side wall 14 and a near end wall 16 with an opening 18 for the discharge of coated tape base 20. The coated tape base is shown by arrows to move upwardly in that portion of the chamber, over a power driven discharge gripping roller 22, formed for example of rubber, mounted on a shaft 24 carried by side supports 26 and 28 attached to the near end wall. The roller and shaft are driven by an endless belt 29, fitting over their far ends, the belt being driven by a pulley and power means, not shown.

Figure 2:
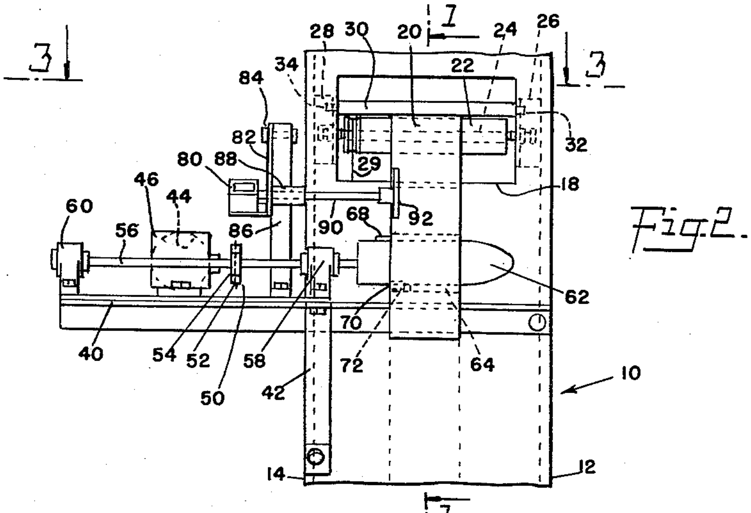
Fig. 2 is an end view in the direction of line 2—2 of Fig. 1.
Figure 3:
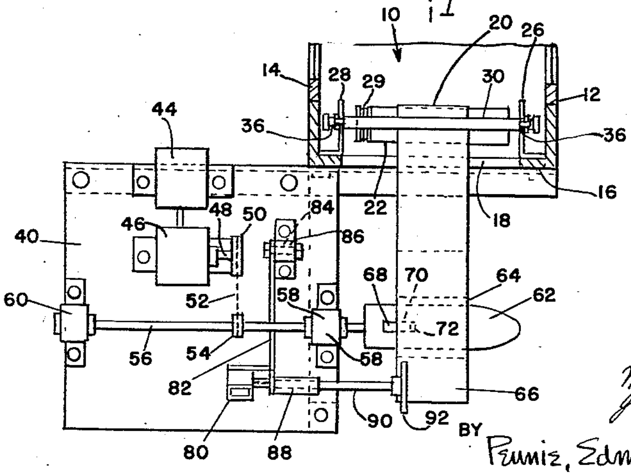
Fig. 3 is a plan sectional view on the line 3—3 of Fig. 2.

A hold-down roller 30 of adequate weight extends transversely across the top of the discharge gripping roller. The ends 32 and 34 (Fig. 2) of the hold-down roller are smaller in diameter than the main portion and fit in drop-slots 36 (Fig. 1) in side supports 26 and 28 (Figs. 2 and 3), the slots acting merely as retainers for the hold-down roller ends and being sufficiently deep so that the hold-down roller is supported freely on the discharge roller by gravity and the two together are adapted to grip the coated tape base passing between them. This becomes important, for example, when it is desired to separate the portion of coated tape base already discharged from the drying chamber from the on-coming portion. The tape base outside of discharge opening 18 may be cut without fear that the forward end of the tape base leaving the opening will be drawn back into, and cause a piling up of on-coming coated tape base in, the drying chamber. The arrangement described permits cutting of the tape base discharged from the drying chamber and at the same time keeping the oncoming tape base within the drying chamber under its normal tension.

The coated tape base passes (Fig. 1) from discharge roller 22 and hold-down roller 30 through opening 18 in the near end wall of the drying chamber to be wound into a roll. The apparatus for this purpose includes a platform 40 and a brace 42 attached below the opening to the end wall of the chamber; a motor 44 (Figs. 2 and 3) operatively connected to a gear reducer 46 (Fig. 3) with a shaft 48 and a sprocket wheel 50; an endless drive chain 52 (Fig. 3) mounted on the sprocket and a second sprocket wheel 54 mounted on a shaft 56 supported in journals 58 and 60; the right end of the shaft, as one views Figs. 2 and 3, being free and integrally fitted with a core 62 adapted to fit in and be keyed to a hub 64 around which the coated tape base is wound into a roll 66. The core is provided with an integral stop 68 and an integral key 70, spaced oppositely from one another. The hub is in turn provided with a key-way 72 adapted to receive the core key.

The apparatus also includes a footage counter 80 secured to the lower end of an arm 82 pivotally mounted at its upper end 84 to the upper end of an upright post 86 secured at its bottom to the platform. A journal 88 is secured to the arm, through which extends a shaft 90 operatively connected at its left end to the counter and at its right end to a friction disc 92, covered for example with rubber, resting on and adapted to be turned by the roll of coated tape. Due to the manner in which the arm is pivoted, the disc, and hence the shaft and counter, rises as the roll of coated tape base increases in size.

If desired, an uncoated roll of tape base may be converted entirely into coated roll 66; that is, the overall length of the coated roll will be substantially the same as that of the uncoated roll. In practice it is usually desirable to start operations with a relatively large uncoated roll and to obtain therefrom a number of smaller coated rolls of specified footage. Footage counter 80 is useful for the purpose. When the coated roll reaches the desired amount of footage, the coated tape base is cut transversely as it leaves discharge opening 18 in the drying chamber.

A few preliminary steps are advantageously taken: Motor 44 is stopped; hub 64 is loosened from core 62 and its key 70; roll 66 and its hub are pulled toward the near end, away from the core; another hub is keyed quickly to the core; the coated tape base is cut as it continues to issue from the discharge opening; the forward portion of the tape base leaving the opening is so firmly gripped by rollers 22 and 36 that it cannot spring back into the chamber and the tension of the tape base moving through the chamber is maintained; the free forward end of the tape base is secured quickly to the second hub; the motor is started and speeded to take up the slack portion of coated tape base outside of the discharge opening; and the speed of the motor is then adjusted to wind the coated tape base at its normal rate on the new roll.

The construction of the apparatus is such that the motor may be stopped; a roll-hub unit may be removed from driven shaft 56; another hub may be placed on the shaft; the on-coming tape base may be cut and its forward end may be attached to the second hub simultaneously; and the motor may again be started, all in the matter of a few seconds. Operators, especially in teams of two or three, with very little training can perform the necessary steps with so much dispatch that very little time is permitted for the piling up of on-coming tape base from the chamber. Such slack tape base as does accumulate is promptly and easily wound on the second hub at a speed somewhat faster than normal, after which normal speed is resumed. The change over is made so smoothly and so quickly that the coating and drying steps proceed at their normal speed. The overall operation is substantially continuous.

It will be clear to those skilled in this art that the above example is by way of illustration only and that useful modifications of the same are adapted for the practice of the invention.

We claim:

1. In the method of producing magnetic sound-recording and sound reproducing tape by passing a relatively long and narrow tape base while under tension successively through a coating zone and a drying zone, the improvement which comprises discharging the coated tape base from the drying zone at a continuous normal rate of speed while maintaining said tension of the tape base as it advances through the drying zone, winding the tape base discharged from the drying zone into a roll, cutting the discharged tape base transversely outside of the drying zone in advance of the roll when a predetermined amount has been wound thereon, continuously maintaining the tension of the coated tape base in the drying zone independently of said roll as the forward end of the cut tape base leaves the drying zone at said normal rate of speed, and allowing the oncoming tape base from the drying zone to fall by gravity and to collect temporarily as loose slack outside of the drying zone and beyond the point where the tension on the tape base is maintained in readiness for winding into another roll.

2. Method according to claim 1, in which the tension of the coated tape base in the drying zone is maintained by gripping the forward portion of the tape base leaving the drying zone so that it cannot spring back into the same.

3. Method according to claim 1, in which the newly formed roll is removed from its winding zone while still integrally secured to tape base leaving the drying zone; the on-coming tape base is then severed from the roll; and another roll is started in the winding zone with the forward end of the on-coming tape base.

4. Method according to claim 1, in which rotation of the newly formed roll is stopped; the roll is removed from the winding zone as the forward portion of unwound tape base continues to issue from the drying zone at its normal rate and accumulates as slack between the drying and winding zones; starting another roll in the winding zone with the forward end of the accumulated slack tape base, rotating the latter roll at a gradually increasing rate of rotation to take up the accumulated slack tape base; and then decreasing the rate of rotation of the roll to that required to wind the tape base as fast as it issues from the drying zone without the accumulation of further slack.

5. Method according to claim 4, in which the on-coming tape base is cut transversely after the first roll is removed from the winding zone.

References Cited in the file of this patent

UNITED STATES PATENTS

| | | |
|---|---|---|
| 1,605,842 | Jones | Nov. 2, 1926 |
| 2,174,129 | Van Kempen | Sept. 26, 1939 |
| 2,253,701 | Greenbaum | Aug. 26, 1941 |
| 2,272,940 | Gerard | Feb. 10, 1942 |
| 2,323,043 | Hopkins | June 29, 1943 |
| 2,379,495 | Roesen | July 3, 1945 |
| 2,393,006 | Vincent | Jan. 15, 1946 |
| 2,424,021 | Cook | July 15, 1947 |
| 2,597,375 | Rinehart | May 20, 1952 |

FOREIGN PATENTS

| | | |
|---|---|---|
| 527,945 | Great Britain | Oct. 18, 1940 |
| 572,624 | Great Britain | Oct. 16, 1945 |